(12) United States Patent
Uebelein et al.

(10) Patent No.: US 6,472,836 B1
(45) Date of Patent: Oct. 29, 2002

(54) METHOD AND ARRANGEMENT FOR ELECTRICALLY CONTROLLING AND REGULATING THE MOVEMENT OF AN ELECTRICALLY OPERATED AGGREGATE OF A MOTOR VEHICLE

(75) Inventors: Joerg Uebelein, Grub am Forst (DE); Stefan Richter, Michelau (DE); Henning Moench, Coburg (DE)

(73) Assignee: Brose Fahrzeugteile GmbH & Co., KG, Coburg, Coburg (DE)

( * ) Notice: Subject to any disclaimer, the term of this patent is extended or adjusted under 35 U.S.C. 154(b) by 0 days.

(21) Appl. No.: 09/806,076

(22) PCT Filed: Sep. 14, 1999

(86) PCT No.: PCT/DE99/02972

§ 371 (c)(1),
(2), (4) Date: Jun. 6, 2001

(87) PCT Pub. No.: WO00/17982

PCT Pub. Date: Mar. 30, 2000

(30) Foreign Application Priority Data

Sep. 22, 1998 (DE) .......................... 198 45 768

(51) Int. Cl.⁷ .................................. G05B 5/00
(52) U.S. Cl. ................ 318/445; 318/434; 318/455; 318/443; 318/466; 318/468; 318/469
(58) Field of Search ............... 318/434, 455, 318/443, 445, 466, 468, 469

(56) References Cited

U.S. PATENT DOCUMENTS 6,239,610 B1 * 5/2001 Knecht et al. ............... 318/434
6,315,355 B1 * 11/2001 Lamm et al. ................ 318/434
6,324,788 B1 * 12/2001 Koneval et al. ............. 318/434

FOREIGN PATENT DOCUMENTS

| DE | 33 03 590 | 8/1984 |
| DE | 40 20 351 | 1/1992 |
| DE | 196 15 123 | 7/1997 |
| GB | 2 198 860 | 6/1988 |
| JP | 61-222843 | 10/1986 |
| WO | WO 97/39509 | 10/1997 |
| WO | WO 98/40945 | 9/1998 |

* cited by examiner

Primary Examiner—Karen Masih
(74) Attorney, Agent, or Firm—Christie, Parker & Hale, LLP (57) ABSTRACT

A method and apparatus for electrically controlling and regulating the movement of an electrically operated aggregate of a motor vehicle, such as a window lifter or sliding roof. A correlation variable for the adjustment force of the aggregate is measured for the purpose of anti-jamming protection. An adjusting movement is switched off or reversed if the adjustment force exceeds a limit value which corresponds to the maximum permissible jamming force. The sensitivity of the anti-jamming system is automatically raised when the motor vehicle is at a standstill. A rough road filter is preferably deactivated so that in the event of jamming, an adjusting movement is switched off or reversed without any time delay. The highest possible level of safety is provided using anti-jamming protection when the vehicle is at a standstill.

43 Claims, 5 Drawing Sheets

METHOD AND ARRANGEMENT FOR ELECTRICALLY CONTROLLING AND REGULATING THE MOVEMENT OF AN ELECTRICALLY OPERATED AGGREGATE OF A MOTOR VEHICLE

CROSS-REFERENCE TO RELATED APPLICATION

This application claims priority of International application number PCT/DE99/02972, filed Sep. 14, 1999, which in turn claims priority to German patent application number 198 45 768.5, filed Sep. 22, 1998.

FIELD OF INVENTION

The invention relates to a method and apparatus for electrically controlling and regulating the movement of an electrically operated aggregate of a motor vehicle, more particularly a window lifter or sliding roof.

BACKGROUND OF INVENTION

From DE 33 03 590 C2 a method is known for electrically operating and monitoring the opening and closing cycle of an electrically operated window lifter in which a state of collision is detected indirectly as a result of a suddenly dropping adjusting speed of the window lifter. As a correlation value for the actual adjustment force of the aggregate, the electric current, the torque or the periodic length of the drive motor of the aggregate is measured. As soon as the adjustment force exceeds the maximum permissible limit value an associated control and regulating electronics emanates from a collision state and causes the drive movement of the window lifter to be switched off or reversed.

DE 40 20 351 A1 describes a method for electronically monitoring the opening and closing cycle of an electrically operated aggregate where an unjustified reversal of the movement of the setting member caused by the action of acceleration forces on the vehicle body is prevented through an additional sensor element which detects the appearance of acceleration forces and sends corresponding signals to a control and regulating electronics unit.

In order to take into consideration the acceleration forces which act on the vehicle body, more particularly to consider the vertical acceleration forces which occur when driving over a stretch of rough road it is further known to undertake temporal filtering of the detected correlation value for undertaken through rough road sensors which consider the detected correlation value over a certain time span, as a rule about 30 milliseconds. With the presence of a stretch of rough road the detected signal fluctuates about a mean value and does not rise permanently as in the case of a jamming situation. By considering the signal over a certain time span it is therefore possible to conclude whether it is merely a question of a rough road stretch or a proper case of jamming.

The drawback with this method is that as a result of the need to consider the detected signal over a certain time span, a jamming situation reversing the adjusting movement of the setting member of the aggregate only follows with a temporal delay. This makes it difficult to meet the stringent safety requirements for the safety of motor vehicle window lifting devices.

Finally, it is known from WO 97/39509 to take into consideration a tacho signal for electronically monitoring an adjustment drive mounted in a vehicle in an arrangement for preparing at least one limit value of a closing force restriction or anti-jamming protection system, and to adjust the limit value of the adjustment force in dependence on the tacho signal.

SUMMARY OF THE INVENTION

The object of the present invention is to provide a method and apparatus for electrically controlling and regulating the movement of an electrically operated aggregate of a motor vehicle. Thus, it possible in any operating state of the motor vehicle, more particularly in the stationary or parking state, to provide the highest possible degree of security for the anti-jamming system to keep the risk of faulty release of the anti-jamming system as low as possible.

By automatically deactivating the rough road filter when the motor vehicle is at a standstill the sensitivity of the anti-jamming protection system is increased and low maximum permissible jamming forces are produced when the vehicle is stationary. The rough road filter of the anti-jamming system normally undertakes a temporal filtering of at least one correlation value for the adjustment force of the aggregate. When the rough road filter is deactivated and the maximum permissible jamming force (which is equal to the limit value of the adjustment force) is exceeded, the adjusting movement is switched off or reversed without any temporal filtering or delay.

The use of a rough road filter for considering a correlation value of the adjusting movement over a certain time span results in jamming, reversing, or switching off the aggregate with a time delay. By switching off the rough road filter when the vehicle is at a standstill this time delay is reduced or eliminated so that the sensitivity of the anti-jamming system is improved.

The invention thus provides for when the vehicle is at a standstill, a situation where children might possibly play unobserved in the vehicle, with maximum sensitivity of the anti jamming protection system. In a preferred embodiment of the invention, the sensitivity of the anti-jamming protection system is maximum when the motor vehicle is at a standstill so that in the event of children playing in a stationary or parked vehicle, the highest level of safety is guaranteed for the anti-jamming protection system.

In a preferred embodiment of the invention, in order to increase the sensitivity of the anti-jamming protection system when the vehicle is stationary, the limit value of the adjustment force is automatically reduced so that the sensitivity of the anti-jamming protection system is increased. The increase in the sensitivity of the anti-jamming system takes place by reducing the limit value of the maximum permissible jamming force which is detected through a correlation value for the adjustment force of the aggregate.

Whether the vehicle is at a standstill can be detected in numerous ways. The stationary or parked state of the motor vehicle can be ascertained through a switched-off ignition, a removed ignition key, the opening of at least one vehicle door, switching off the engine, opening a seat belt of an occupant or by an occupant getting out of the vehicle.

In the case of a motor vehicle with passive-entry/passive-go system, a stationary state of the vehicle is assumed when the identification transmitter is removed from the motor vehicle. In the case of passive-entry/passive-go systems, an identification transmitter is provided with a transponder through which the vehicle automatically recognizes when the vehicle driver is approaching or moving away, and correspondingly, the doors and windows of the motor vehicle become automatically opened or locked. Further applications are thereby possible.

Furthermore, a stationary state of the motor vehicle can be assumed when the engine is running, the brake pedal is activated and/or no gear is engaged. The same applies to the case where the engine is running, the gear is engaged, and a certain engine speed threshold is understepped. The vehicle is, for example, in the waiting position at traffic lights or shortly before starting off. The last two mentioned variations of the invention have the advantage that lowering the sensitivity of the anti-jamming protection according to the invention is also provided when the vehicle is in the standstill phases during a journey.

Furthermore, the vehicle is advantageously assumed to be at a standstill when remote control is activated for closing the aggregate or closing the vehicle doors or if automatic events take place when the ignition is switched off, e.g. controlled by a rain sensor. Thus, it is often standard for both doors of the vehicle to be locked and the windows to be closed through a remote control. Since persons or animals might possibly still be in the vehicle, the maximum sensitivity of the anti-jamming protection is set. The same applies during automatic closing of the windows, possibly initiated by the rain sensor of a cabriolet. With automatic closing of the aggregate or of the vehicle doors through a remote control, or during automatic events with the ignition switched off, the maximum sensitivity of the anti-jamming protection is set since the driver leaving the vehicle might possibly no longer see a jamming case or hear calls for help.

The limit value of the adjustment force correlating with the maximum permissible jamming force can be set in dependence on the adjusting position, i.e. the lifting position of the aggregate, as is known from DE 33 03 590 C2. It is thereby possible to take into account different local friction forces and to set the maximum permissible adjustment force for each lift position as low as possible. An adaptation of the maximum permissible jamming force to the relevant adjusting position or the friction values can take place, i.e. a self-learning system can be used.

The apparatus according to the invention includes an indirectly detecting anti-jamming protection system with a control and regulating electronics unit which sets the limit value of the adjustment force. In the event of the set limit value being exceeded, the unit sends control commands to the drive unit of the aggregate for reversing or switching off a drive movement. According to the present invention, the control and regulating electronics is connected to means for detecting the stationary state of the motor vehicle, and the sensitivity of the anti-jamming protection is increased when the motor vehicle is stationary.

In addition, the anti-jamming protection system has a filter, more particularly a rough road filter, for the temporal filtering of the detected correlation value for the adjustment force of the aggregate. The control and regulating electronics unit is connected to the filter and deactivates the rough road filter in order to increase the sensitivity of the anti-jamming protection system.

In addition, the control and regulating electronics unit can reduce the adjustable limit value of the adjustment force when the motor vehicle is at a standstill so that the sensitivity of the anti-jamming protection system is increased.

The means for detecting a stationary state of the motor vehicle can be provided by a sensor which recognizes the state of the ignition of the motor vehicle and/or the presence of the ignition key in the ignition lock. Alternatively, or in addition, the closed state of at least one vehicle door, the state of the engine, more particularly the engine speed, the signals of the identification transmitter of a passive-entry/passive-go system, an occupant getting out of the vehicle, or the opening of a seat belt is detected. Furthermore, the stationary state of the vehicle can be detected by means which recognizes activation of the brake pedal, engaging a gear, use of remote-control for closing the aggregate and/or the doors of the motor vehicle, and/or activation of an automatic run of the aggregate when the ignition is switched off. These parameters are detected either directly through corresponding sensor elements or indirectly.

In a preferred embodiment the control and regulating electronics unit is connected through a serial data bus to the means for determining a stationary state of the vehicle. Digital e and data transfer are possible by using digital on-board intelligence systems and a modular construction of the system.

A device is provided for detecting a correlation value for the adjustment force of the aggregate which is connected to the control and regulating electronics unit and which detects the periodic length, the electric current, and/or the torque of the drive motor of the drive unit. A device of this kind is, for example, an electric power meter which permanently detects the power consumption of the drive motor, or an impulse transmitter which detects the rev speed or periodic length of the motor shaft of the drive motor.

BRIEF DESCRIPTION OF THE DRAWINGS

The invention will now be explained in further detail with reference to the embodiments shown in the drawings in which.

DETAILED DESCRIPTION

Figure 2A:
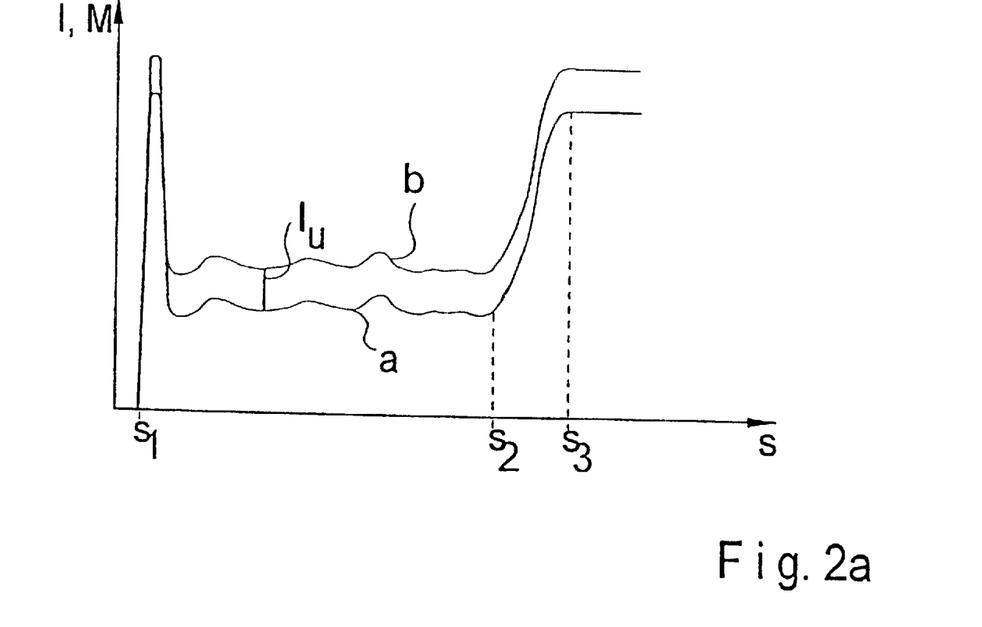
FIG. 2a is a diagrammatic view of the motor current or motor torque of a drive motor in dependence on the adjusting path of a window lifter system including an envelope curve to which the maximum permissible adjustment force corresponds.

The terms used will first be explained with reference to FIG. 2a. FIG. 2a shows a measuring curve a which represents the current I taken up by the adjusting motor or drive motor of a window lifter system, and the motor torque M produced over the lifting positions. The motor torque M produced is proportional to the current I taken up by the adjusting motor.

The lift position $s_1$ represents the start of a window pane during a closing process at the lower stop, with the entrance into the upper window seal beginning at the lift position $s_2$ and the window pane stopping against the upper door frame at the lift position $s_3$. The curve a corresponds to the force. which is actually required to displace the window pane.

The normal curve a for the current collection of the drive motor is determined, for example, by a standardizing run prior to installing the window pane and window lifter system.

The maximum permissible adjustment force, i.e. the limit value of the adjustment force, is fixed by an envelope curve b. The maximum permissible adjustment force corresponds to the maximum permissible torque of the drive motor, which in turn corresponds to the maximum permissible current which is taken up by the adjusting motor. The envelope curve b defines the maximum permissible current, and thus, the maximum permissible adjustment force. By way of example, it is proposed to restrict the maximum permissible adjustment force to less than 100 N.

The difference $I_u$ between the envelope curve b and the normal curve a corresponds to the excess force, i.e. the force which exceeds the force just required to adjust the window pane. The excess force thereby provides a tolerance which prevents a jamming case being assumed in the event of slight disturbances such as, for example, undulating ground or washboard-type road coverings, or bad weather road conditions (e.g. ice).

When the window pane is lifted, the current I of the electric motor reaches the maximum value fixed by the envelope curve b which corresponds to the maximum value of the adjustment force or excess force the adjusting movement is switched off or reversed. In the event of jamming, more particularly, in the case of "hard" jamming, or jamming of an object or part of the body with an immediate standstill of the electrically operated aggregate, the limit value of the adjustment force fixed by the envelope curve b is equal to the maximum permissible jamming force. When the maximum permissible jamming force is exceeded, switching off or reversing of the window pane adjustment occurs.

Figure 2B:
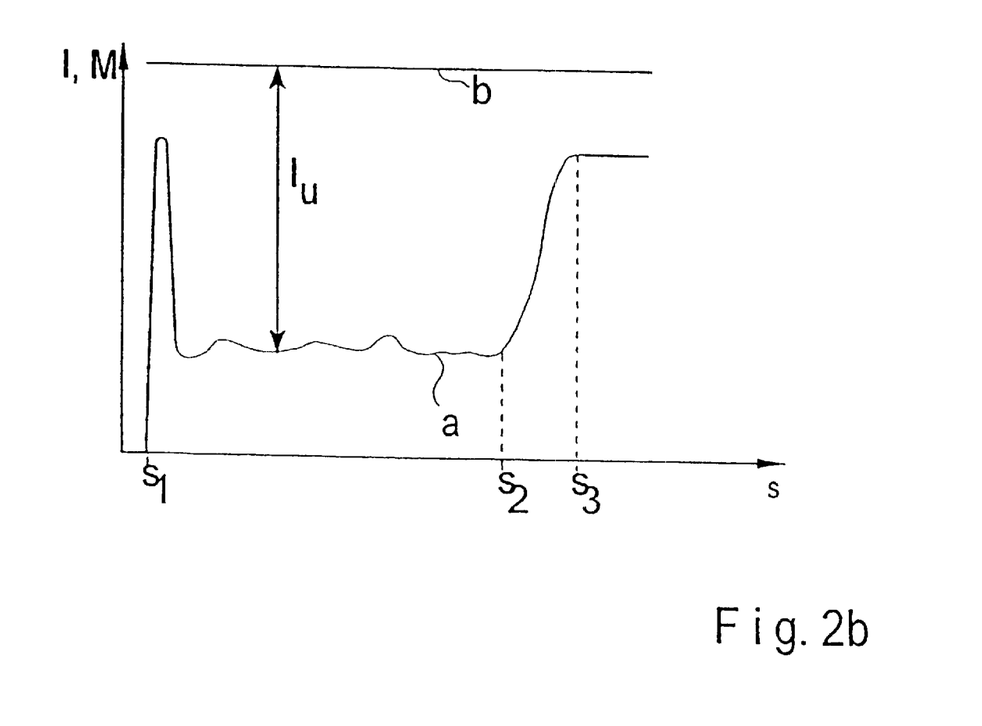
FIG. 2b shows a diagrammatic view of the motor current or torque according to FIG. 1a wherein the envelope curve is a constant.

In FIG. 2b, the maximum permissible adjustment force is not dependent on the lift position s, but is constant over the entire adjusting path. Correspondingly, the maximum value of the current I or torque M fixed by the envelope curve b is constant. This simplified fixing of the maximum permissible adjustment force does not take into account the changing normal power requirements of the drive motor along the adjusting path and the excess force (corresponding to $I_u$) to be added to the curve a is therefore unnecessarily high in places, which leads to an unnecessary high value of the maximum permissible adjustment force or the maximum permissible jamming force. On the other hand, the adjusting electronics can be simplified and the standardizing run necessary to determine the normal curve a can be eliminated.

Figure 1A:
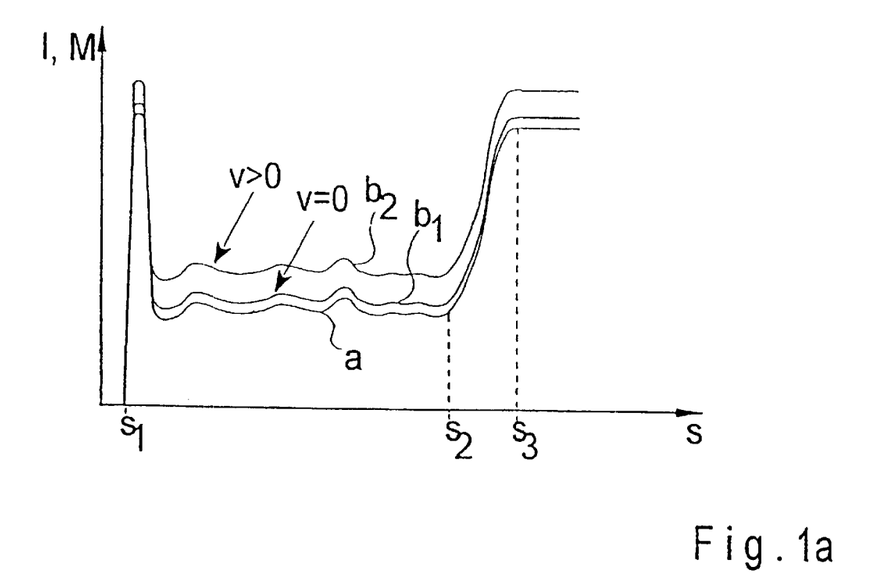
FIG. 1a is a diagrammatic view of the dependence of the limit value of the adjustment force according to the invention, wherein the limit value of the adjustment force is additionally dependent on the adjusting path of the window lifter system.

FIG. 1a shows lowering of the maximum permissible adjustment force according to the invention when the motor vehicle is at a standstill. When the motor vehicle is at a standstill (v=0), the limit value of the adjustment force for any lifting position is set to a minimum value (corresponding to the envelope curve $b_1$), i.e. the difference between the envelope curve $b_1$ and the normal curve a is minimal. The sensitivity of the anti-jamming system is hereby maximum.

When the speed of the motor vehicle is greater than zero (v>0), the lowering of the envelope curve $b_2$ of the motor current which fixes the limit value of the adjustment force is cancelled. The anti-jamming system is correspondingly less sensitive.

Figure 1B:
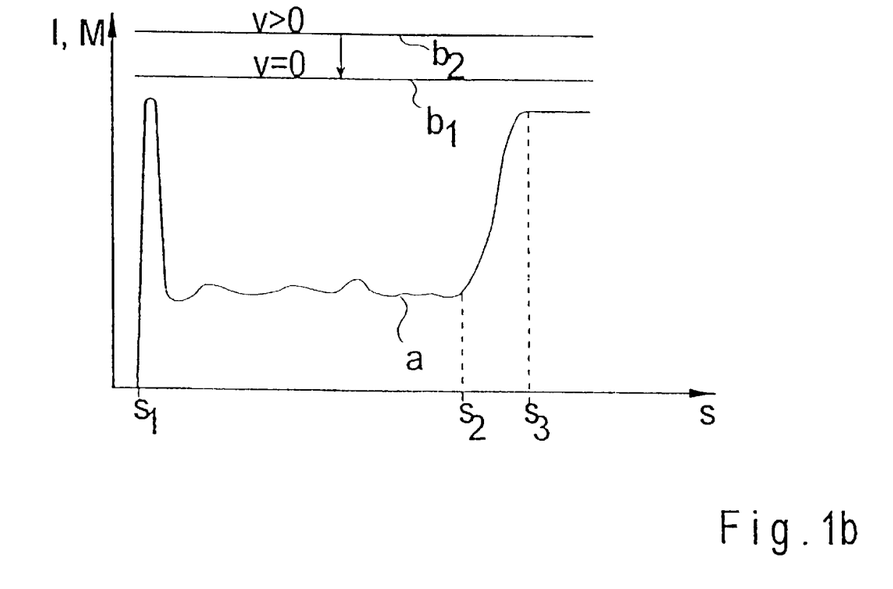
FIG. 1b is a diagrammatic view of the dependence of the limit value of the adjustment force according to the invention, wherein the limit value of the adjustment force is independent of the adjusting path of the window lifter system.

FIG. 1b shows this behavior when the limit value of the adjustment force is constant over the adjusting path s.

Figure 3:
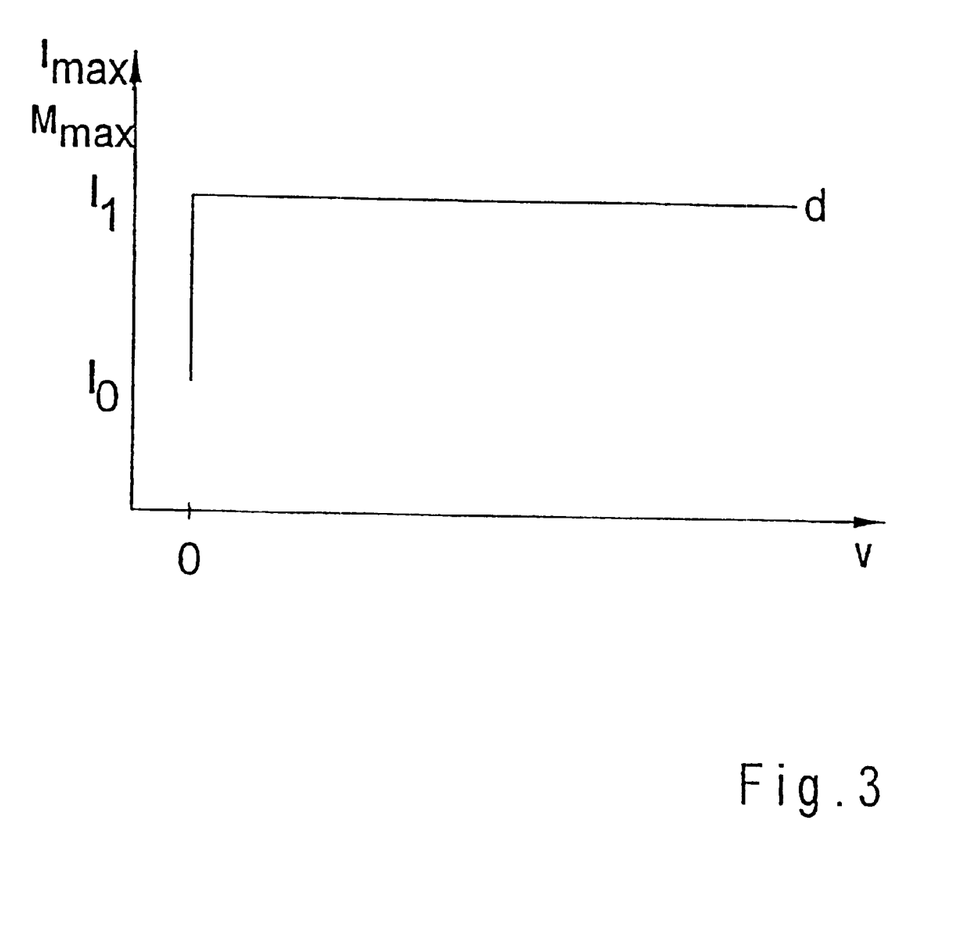
FIG. 3 shows the limit value of the motor current or motor torque at a certain lift position in dependence on whether the vehicle is or is not at a standstill.

FIG. 3 shows the maximum current $I_{max}$ taken up by the adjusting motor and the maximum torque $M_{max}$ given out for a certain lift position. When the vehicle is at a standstill (V=0), the limit value of the adjustment force is at a minimum value $I_0$. The maximum permissible jamming force is lowered. During movement of the motor vehicle (V>0), the limit value of the adjustment force is set to a constant higher value 11 (curve d).

Figure 4:
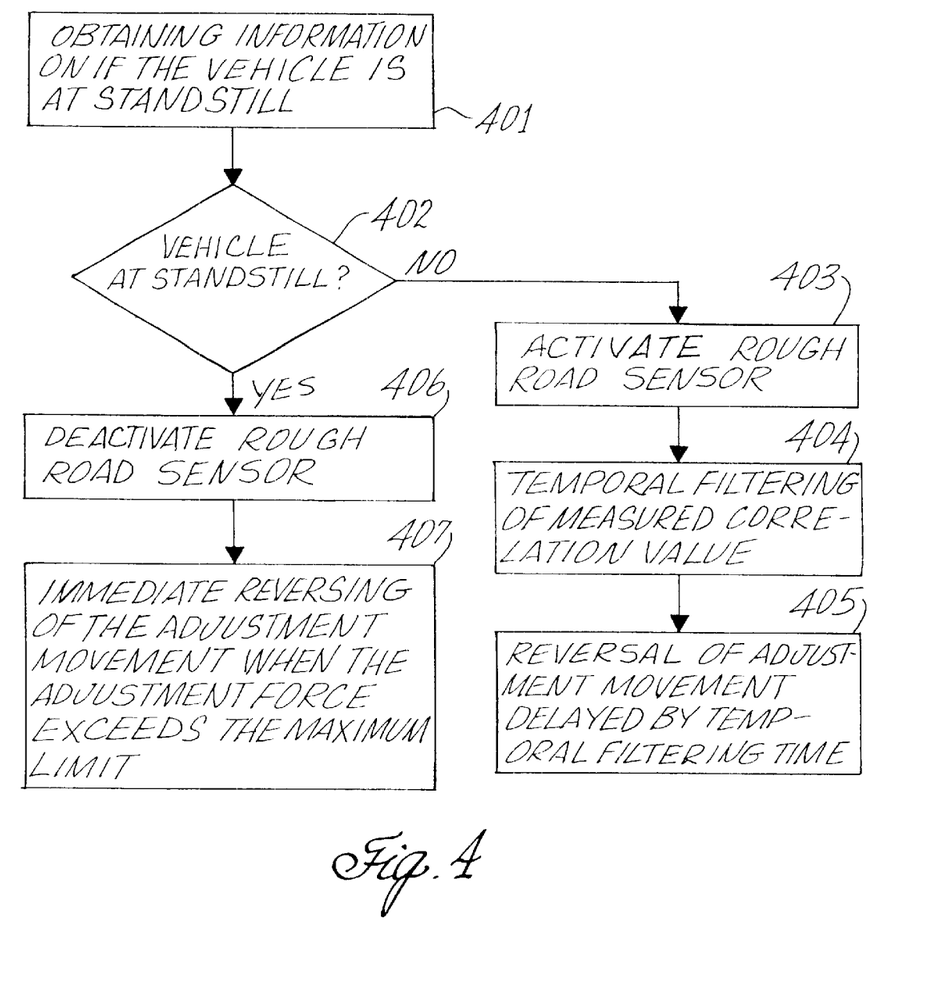
FIG. 4 shows a flow chart of the variation of the method according to the invention in which the rough road filter is switched off when the vehicle is stationary.

FIG. 4 shows an alternative embodiment of the invention in which the increase in the sensitivity of the anti-jamming system is reached not by lowering the maximum permissible jamming force, but by deactivating a rough road sensor. It is pointed out here that both variations can also be used simultaneously.

According to FIG. 4, information is initially obtained to whether the vehicle is at a standstill or in a stationary state (step 401), e.g., by monitoring the state of the ignition of the vehicle.

If no standstill of the motor vehicle is detected (step 402), then the rough road sensor of the anti-jamming system is activated or an existing activation is maintained (step 403). The rough road sensor implements a temporal filtering of the detected correlation value of the adjusting movement (step 402). By way of example, it determines the speed of the drive motor of the assembly. The rough road sensor examines whether, in the event of exceeding the limit value of the adjustment force (or the maximum permissible jamming force), the increased adjustment force is fluctuating about a mean value, or whether an actual rise is taking place.

In the first instance, only a rough road is present, and the values which are fluctuating about a mean value are due to the acceleration of the setting member of the aggregate as a result of the rough road stretch. The switch off criterion and the maximum permissible adjustment force respectively are then set high so that the sensitivity of the anti-jamming system is lowered and a faulty release as a result of the rough road stretch is avoided. In the second case, the adjustment movement of the aggregate is switched off or reversed. As a result of the temporal filtering of the recorded correlation variable, switching-off or reversal can take place with a certain time delay which normally amounts to about 30 ms (step 405).

If the motor vehicle is detected as being at a standstill (step 402), then the rough road sensor is deactivated (step 406). This eliminates any time delay in switching off or reversing the adjusting movement in the event of jamming. An immediate reversing of the adjustment movement of the aggregate takes place when the adjustment force exceeds the maximum permissible limit value or the maximum permissible jamming force (step 407). This leads to an increased sensitivity of the anti-jamming system when the motor vehicle is at a standstill. At the same time the risk of faulty triggering of the anti-jamming system is not increased since the limit value of the adjustment force when the motor vehicle is stationary is not lowered.

Figure 5:
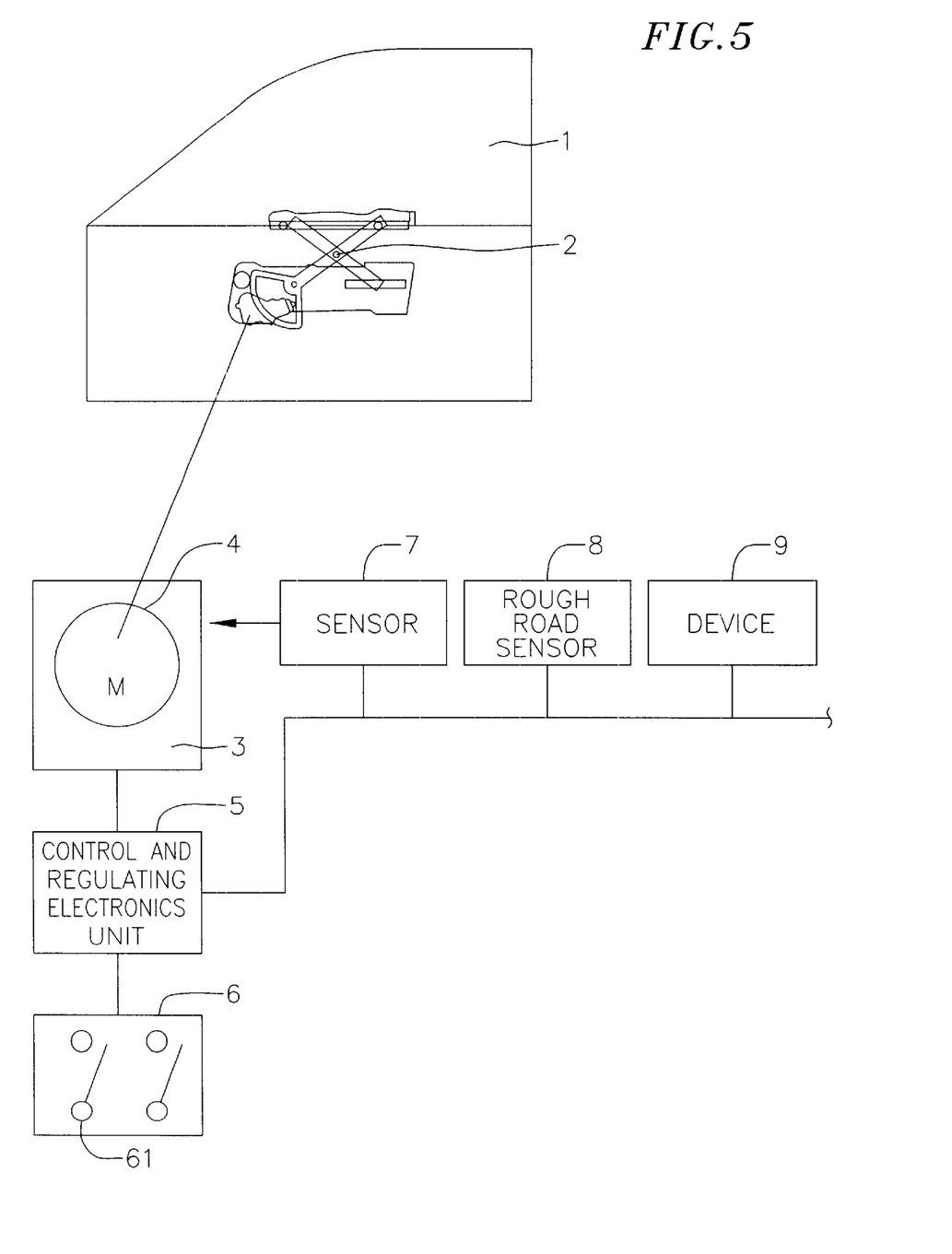
FIG. 5 shows a diagrammatic view of the construction of an arrangement according to the invention for controlling a window lifter system.

FIG. 5 shows a block circuit diagram of an arrangement for implementing the method according to the invention with a window lifter adjusting system as the electrically operated aggregate for adjusting a window pane 1 by means of a window lifter mechanism 2 which can be, for example, the mechanism of a cable window lifter or a cross arm window lifter.

The window lifter mechanism 2 is driven by a drive unit 3 with a drive motor 4. The drive unit 3 is controlled and regulated by a control and regulating electronics unit 5. The control and regulating electronics unit 5 includes a microprocessor and the conventional chips associated therewith such as a RAM data memory. The control and regulating electronics unit 5 is connected to an operating element 6 through which control commands, such as, for example, for lifting and lowering the window pane, can be sent to the control and regulating electronics unit 5 by a user. The operating element 6 has suitable electrical switching elements 61 which are preferably mounted in the center console of the vehicle or on the door inside trim.

The control and regulating electronics unit 5 is connected through a serial data bus 10 to several sensors or devices 7, 8, 9. The serial data bus 10 is a CAN (Controller Area Network) bus, which is formed by a twin wire line on which digital data is serially transferred according to a fixed standardized protocol.

The sensors and devices 7, 8, 9 are each connected to the CAN-bus 10 through an interface (not shown).

Alternatively, further elements of the apparatus, such as the operating element 6 and the drive unit 4, are attached to the serial CAN-data bus.

The sensor 7 serves to record a correlation variable for the adjustment force of the aggregate. The electrical current of the drive motor 4 or the torque of the drive motor 4 is measured or the periodic length of the drive motor 4 is measured by Hall sensors, and this information is passed to the control and regulating electronics unit 5.

The sensor 8 is a rough road filter which evaluates whether a stretch of rough road is present and sends control signals to the control and regulating electronics unit 5. The sensor 8 can also be integrated in the control and regulating electronics unit or can be formed by the microprocessor and associated software. To evaluate whether a stretch of rough road exists, temporal filtering is performed.

The device 9 detects whether the motor vehicle is at a standstill. This can be determined in numerous different ways. In a preferred embodiment, the device 9 is the ignition lock of the vehicle which is connected directly to the control and regulating electronics unit 5 through the serial data bus 10. The ignition lock detects the state of the ignition of the vehicle, and through the S-contact signal (key contact signal), whether an ignition key is located in the ignition lock, and transfers corresponding signals through the bus 10 to the control and regulating electronics unit 5.

Alternatively, through a separate line connection between the control and regulating electronics unit 5 and the ignition lock, whether signals are present which relate to an ignition or an S-contact is measured directly. A separate sensor can also be provided to measure the state of the ignition. The control and regulating unit is preferably mounted in the motor vehicle door.

In a further embodiment, the device 9 has means through which the locking state of at least one vehicle door is identified. The door lock (not shown) for each door is connected, for example, to the bus 10 so that signals relating to the opening state of the lock are transferred to the control and regulating electronics unit 5 and evaluated. The closing state of the doors is preferably evaluated in conjunction with the state of the ignition in order to safely identify the stationary state of the vehicle.

A further possibility for identifying a stationary state of the vehicle is device 9 detecting the engine state, more particularly, the engine speed. In this case, the device 9 can be the speedometer, and the corresponding information can be transferred through the serial bus 10 to the control and regulating unit.

Device 9 can be a sensor device which recognizes transponder signals of the identification transmitter of a passive-entry/passive-go system. Receiving no more signals indicates that the vehicle owner has left his vehicle and parked the car so that the sensitivity of the anti-jamming system is raised to protect small children or animals remaining in the vehicle. The sensor for detecting transponder signals is preferably connected to the serial bus, and the control and regulating electronics unit 5 automatically raises the sensitivity of the anti-jamming system in the absence of transponder signals.

Furthermore, the device 9 can be a passenger detector system or a seat occupancy detector unit. This unit identifies the driver or front-seat passenger getting out of the vehicle, which indicates the vehicle at a standstill. The opening of the seat belt of the driver and/or passenger can be monitored, with the seat belt system preferably being connected to a serial bus.

In a further embodiment, the device 9 detects activation of the brake pedal and/or engagement of a gear. In the event of an engaged brake pedal, in conjunction with a gear being disengaged, it is assumed that the vehicle is at a standstill. The device 9 is embodied by the brake device and the clutch, which in turn, preferably send corresponding signals through the serial bus to the control and regulating electronics unit 5. Alternatively, a direct line connection is provided between the device 9 and the control and regulating electronics unit 5.

In a further embodiment, the device 9 exists in a sensor which detects signals of a remote control for closing a window pane and/or the motor vehicle doors. Such a signal is sent to the control and regulating electronics unit which then steps up the sensitivity of the anti-jamming protection to protect small children or animals which may be in the vehicle when the person leaving the vehicle who, through remote control, causes the closing of the vehicle, e.g. vehicle window, and may no longer observe a jamming event.

The same applies to the case where the device 9 is a sensor which causes an automatic run of events for closing the aggregate or window when the ignition is switched off, for example a rain sensor of a cabriolet.

It is pointed out here that the aforementioned information can be used in parallel to determine a standstill state of the motor vehicle.

The control and regulating electronics unit 5 fixes the sensitivity of the anti-jamming system. This takes place as described in dependence on whether the vehicle is at a standstill. A stationery or standstill state is determined based on signals of the device 9.

The control and regulating electronics unit 5 continuously determines the actual adjustment force through the signals of the sensor device 7 which detects a correlation variable for the adjustment force of the aggregate. When the vehicle is at a standstill, the rough road sensor 8 is activated and/or the limit value of the adjustment force correlating with the maximum permissible jamming force is lowered.

On exceeding the limit value of the adjustment force, the control and regulating electronics unit 5 assumes a jamming state and generates control commands to the drive unit for reversing or switching off a drive movement. The control and regulating electronics unit controls a switch device (not shown) of the drive unit, e.g., semiconductor switch elements, and current direction through the electric motor 4 is changed to reverse the direction of movement.

With a deactivated rough road sensor 8, temporal filtering of the signals detected by the sensor device 7 is discontinued so that on exceeding the limit value of the adjustment force, a reaction of the anti-jamming system and a reversal of the drive movement take place without any time delay.

An optional additional feature is that the control and regulating electronics unit 5 lowers the sensitivity of the anti-jamming system during the time in which the starter of the vehicle is activated so that even in this short phase of modified characteristics, an active anti-jamming system is present.

What is claimed is:

1. A method for electrically controlling and regulating movement of an electrically operated aggregate of a motor vehicle with an anti-jamming system, comprising:

measuring a correlation variable for an adjustment force of the electrically operated aggregate;

switching an adjusting movement of the electrically operated aggregate if the adjustment force exceeds a limit value which corresponds to the a maximum permissible jamming force; and filtering, on a temporal basis, the correlation value for the adjustment force of the electrically operated aggregate, and deactivating the filtering when the motor vehicle is in a stationary state, wherein a sensitivity of the anti-jamming system is increased automatically when the motor vehicle is in the stationary state.

2. The method according to claim 1, wherein the sensitivity of the anti-jamming system is set to a maximum value when the motor vehicle is in the stationary state.

3. The method according to claim 1 in order to increase the sensitivity of the anti-jamming system when the motor vehicle is in the stationary state, further comprising automatically reducing the limit value of the adjustment force so that the sensitivity of the anti-jamming system is increased.

4. The method according to claim 1, wherein the stationary state of the motor vehicle is identified according to whether an ignition of the motor vehicle is deactivated.

5. The method according to claim 4, in order to identify whether the motor vehicle is in the stationary state, further comprising determining whether, after the ignition is deactivated, a vehicle door is opened.

6. The method according to claim 1, wherein the stationary state of the motor vehicle is identified by switching off an engine of the motor vehicle.

7. The method according to claim 1, wherein the motor vehicle includes a passive-entry/passive-go system with an identification transmitter, and wherein the motor vehicle is assumed to be in the stationary state if the identification transmitter is removed from the motor vehicle.

8. The method according to claim 1, wherein the motor vehicle includes a passenger identification system, further comprising detecting a presence of an occupant in the motor vehicle.

9. The method according to claim 1, wherein the motor vehicle is assumed to be in the stationary state if a door of the motor vehicle is opened.

10. The method according to claim 1, wherein the motor vehicle is assumed to be in the stationary state if an engine of the motor vehicle is running and a brake pedal is actuated.

11. The method according to claim 1, wherein the motor vehicle is assumed to be in the stationary state if an engine of the motor vehicle is running below a threshold engine speed and a gear is engaged.

12. The method according to claim 1, wherein the motor vehicle is assumed to be in the stationary state if a remote control is actuated to close the electrically operated aggregate.

13. The method according to claim 1, when the electrically operated aggregate is closed through a remote control, further comprising setting the sensitivity of the anti-jamming system to a maximum value.

14. The method according to claim 1, wherein the limit value of the adjustment force correlating with the maximum permissible jamming force is adjusted based on an adjustment position of the electrically operated aggregate.

15. The method according to claim 2 wherein, in order to increase the sensitivity of the anti-jamming system when the motor vehicle is in the stationary state, the limit value of the adjustment force is automatically reduced so that the sensitivity of the anti-jamming system is increased.

16. The method according to claim 2, wherein deactivating the sensor further comprises deactivating a rough road sensor.

17. The method according to claim 1, wherein the stationary state is based on one of an ignition key removed from the motor vehicle, an open door of the motor vehicle, a deactivated ignition of the motor vehicle, a key removed from the motor vehicle, a passenger exiting the motor vehicle, a driver exiting the motor vehicle, an open seat belt of the motor vehicle, an engine of the motor vehicle running while a gear is not engaged, a remote control actuated to lock of a door of the motor vehicle, and a remote control actuated in response to an automatic event resulting from switching off the engine of the motor vehicle.

18. The method according to claim 17, wherein the stationary state is based on the remote control actuated in response to the automatic event, the automatic event being governed by a rain sensor.

19. The method according to claim 1, when the a door of the motor vehicle is closed through a remote control, further comprising setting the sensitivity of the anti-jamming system to a maximum value.

20. The method according to claim 1, when an automatic event occurs with an ignition switched off, further comprising setting the sensitivity of the anti-jamming system to a maximum value.

21. The method according to claim 1, wherein the correlation value is on one of a speed of a motor of the electrically operated aggregate, and a torque of the motor of the electrically operated aggregate.

22. The method according to claim 1, further comprising adjusting the maximum permissible jamming force based on different positions of the electrically operated aggregate.

23. The method according to claim 1, wherein the maximum permissible jamming force is determined based on one of an animal being caught within the electrically operated aggregate, and a person being caught within the electrically operated aggregate.

24. The method according to claim 1, wherein the electrically operated aggregate is one of
- a window of the motor vehicle, and
- a slidable roof of the motor vehicle.

25. The anti-jamming system according to claim 1, wherein the correlation value is one of
- a speed of a motor of the electrically operated aggregate, and
- a torque of a motor of the electrically operated aggregate.

26. The anti-jamming system according to claim 1, further comprising adjusting the maximum permissible jamming force based on different positions of the electrically operated aggregate.

27. The anti-jamming system according to claim 1, wherein the maximum permissible jamming force is determined based on one of
- an animal being caught within the electrically operated aggregate, and
- a person being caught within the electrically operated aggregate.

28. The anti-jamming system according to claim 1, wherein the electrically operated aggregate is one of
- a window of the motor vehicle, and
- a slidable roof of the motor vehicle.

29. An anti-jamming system for an electrically operated aggregate of a motor vehicle comprising:
- a drive unit for controlling and regulating movement of the electrically operated aggregate;
- a control and regulating electronics unit which evaluates a correlation variable for an adjustment force of the electrically operated aggregate,
- a filter for temporal filtering of the correlation value for the adjustment force of the electrically operated aggregate; and
- a determination unit to determine if the motor vehicle is in a stationary state, the determination unit connected to the control and regulating electronics unit,
- wherein the control and regulating electronics unit sets a limit value of the adjustment force correlating with a maximum permissible jamming force,
- wherein, if the limit value is exceeded, the control and regulating electronics unit sends a control command to the drive unit to reverse a drive movement of the electrically operated aggregate and,
- wherein the control and regulating electronics unit deactivates the filter if the vehicle is in the stationary state.

30. The anti-jamming system according to claim 29, wherein the control and regulating electronics unit lowers the limit value of the adjustment force when the motor vehicle is in the stationary state.

31. The anti-jamming system according to claim 29, wherein the determination unit identifies a state of an ignition of the motor vehicle.

32. The anti-jamming system according to claim 29, wherein the determination unit identifies a state of a door of the motor vehicle.

33. The anti-jamming system according to claim 29, the determination unit identifies a state of the engine.

34. The anti-jamming system according to claim 29, further comprising an identification transmitter of a passive-entry/passive go system, wherein the determination unit identifies a signal of the identification transmitter.

35. The anti-jamming system according to claim 29, wherein the determination unit identifies when an occupant exits the motor vehicle.

36. The anti-jamming system according to claim 29, wherein the determination unit identifies actuation of the a brake pedal of the motor vehicle.

37. The anti-jamming system according to claim 29, wherein the determination unit identifies use of a remote control for closing the electrically operated aggregate.

38. The anti-jamming system according to claim 29, wherein the control and regulating electronics unit is connected through a serial data bus to the determination unit.

39. The anti-jamming system according to claim 29, further comprising a device for determining the correlation variable for the adjustment force of the electrically operated aggregate, wherein the correlation variable determining device is connected to the control and regulating electronics unit.

40. The anti-jamming system according to claim 33, wherein the state of the engine comprises an engine speed.

41. The anti-jamming system according to claim 29, wherein the determination unit identifies one of
- an occupant opening a seat belt of the motor vehicle,
- a gear of the motor vehicle being engaged,
- an actuation of a brake pedal of the motor vehicle,
- use of a remote control for closing a door of the motor vehicle, and
- use of a remote control for automatic activation of the electrically operated aggregate when the ignition is switched off.

42. The anti-jamming system according to claim 41, wherein the automatic activation is controlled through a rain sensor.

43. The anti-jamming system according to claim 39, wherein the device for determining the correlation variable determines one of
- a periodic length of a drive motor of the drive unit,
- an electric current of a drive motor of the drive unit, and
- a torque of a drive motor of the drive unit.

* * * * *